April 30, 1935.     G. E. HOWARD     1,999,762
METHOD OF MAKING GLASS
Filed Jan. 18, 1933     2 Sheets-Sheet 2

Witness:
W. D. Thayer

Inventor:
George E. Howard
by Brown & Parham
Attorneys

Patented Apr. 30, 1935

1,999,762

UNITED STATES PATENT OFFICE 1,999,762

METHOD OF MAKING GLASS

George E. Howard, Butler, Pa., assignor to Hartford-Empire Company, Hartford, Conn., a corporation of Delaware Application January 18, 1933, Serial No. 652,308

10 Claims. (Cl. 49—54)

This invention relates to a method of the making of glass in a tank type of furnace, and has to do more particularly with a method of operating such a furnace in which provision is made for accommodating the furnace construction and operation to the production of glass at widely different rates.

Ordinary glass, such as is used in bottles, is usually made from a batch mixture including silica (sand), fluxes, such as soda ash, and lime, along with smaller amounts of certain other constituents. These materials have widely different melting points and must after fusion be treated by a refining operation in order to homogenize the various materials and the final product and permit the necessary chemical reactions to take place. This homogenizing or refining is accompanied by the giving off of material quantities of gases, which first collect in bubbles, and gradually work out through the surface of the glass and pass out of the furnace along with the products of combustion. As a practical matter, it has been found that the portion of the process from the melting through the refining of the glass occupies a material time. In other words, there is a very definite time factor which must be taken into account in the making of glass. The higher the temperature to which the glass is exposed, the shorter is the time required in order to accomplish a certain amount of refining of the glass and thus to produce glass of a uniform quality.

One difficulty which has arisen with many tank furnaces now in use is that the glass drawn therefrom is not homogeneous. This difficulty has been especially pronounced when the tanks are used at different rates.

Some of the most modern types of tanks attempt to maintain predetermined uniform temperatures at different zones thereof, so that the glass in passing through the tank is exposed to a definite temperature gradient. Even in these modern and improved types of tanks, the results are sometimes non-uniform in that if the tanks are operated at the rate at which they operate most efficiently, the glass is of uniform good quality. If, however, this rate be increased, the quality of the glass falls, as insufficient time is allowed for the proper refining of the glass. On the other hand, if the rate be reduced materially and the same temperatures be maintained requiring substantially the same amount of fuel, the glass may perhaps be somewhat more refined, but as a practical matter this increased refining is unnecessary, so that the result is that the cost of operating the tank when operating at such a reduced rate is substantially as great as when operating at full capacity. The glass under these circumstances is no better for manufacturing the articles for which it is to be used, and further, is of a somewhat different character, even though this character might, according to a strict analysis, be somewhat better.

Among the objects of the present invention, therefore, is to provide a glass melting tank, and more particularly a method of operating such a tank, which will be so flexible that it is economically practicable to make glass at widely different rates and particularly in which the cost per ton of glass is more nearly uniform for such different rates. More particularly it is an object of the present invention to provide a tank and method of operation therefor in which the quality and character of the glass is substantially uniform, independently of the rate at which it is made, due to the taking into account in the manufacture of the glass of the heat-time factor which influences the refining of the glass.

A more specific object of the invention is to provide a method of operating a glass melting tank in which a substantially uniform and constant high temperature is provided at a refining zone, so that all the glass, irrespective of the rate of operation of the tank, will be raised to this definite temperature for the release of the included gases, while at the same time providing different temperature gradients for the glass in accordance with the rate of pull on the tank, specifically raising the temperature gradient and the outlet temperature of the gases for an increased pull, according to a desired schedule and tending toward a situation in which the average temperature of the gases in passing from their point of generation to the outlet from the furnace times the average time for glass passing from the point at which it is melted to the high temperature refining zone will be substantially a constant within the economical operating range, i. e. down to an operating ratio not less than 50% of the rated capacity of the furnace, and further that this average time for the glass passing from the point at which it is melted to the high temperature refining zone times a function of the temperature will be substantially a constant for the same operating range as aforesaid.

A further object of the present invention is to provide a method of making glass in a tank type furnace as above set forth in which the fuel and air for generating products of combustion are supplied to the furnace at a refining zone therein at a rate such as to maintain that zone at a substantially constant high temperature for the refining of the glass, while the products of combustion at a materially lower temperature than that in the refining zone are conducted from the furnace adjacent to that portion thereof to which the glass making materials are supplied, thus providing for the melting of these materials by the "tail heat" and utilizing a large proportion of the heat content of the gases in the furnace to perform useful work therein. This results in much more economical furnace operation than any used or taught by the prior art.

Other and more detailed objects of the present invention will become apparent from a reading of the following specification and sub-joined claims when taken in connection with the accompanying drawings, in which:

Fig. 5 is a view in fragmentary vertical section and on an enlarged scale showing a manner in which the crown of the tank and the recuperator structure are supported; this view may be considered as an enlargement of a portion of the structure illustrated in Fig. 4.

Figure 1:
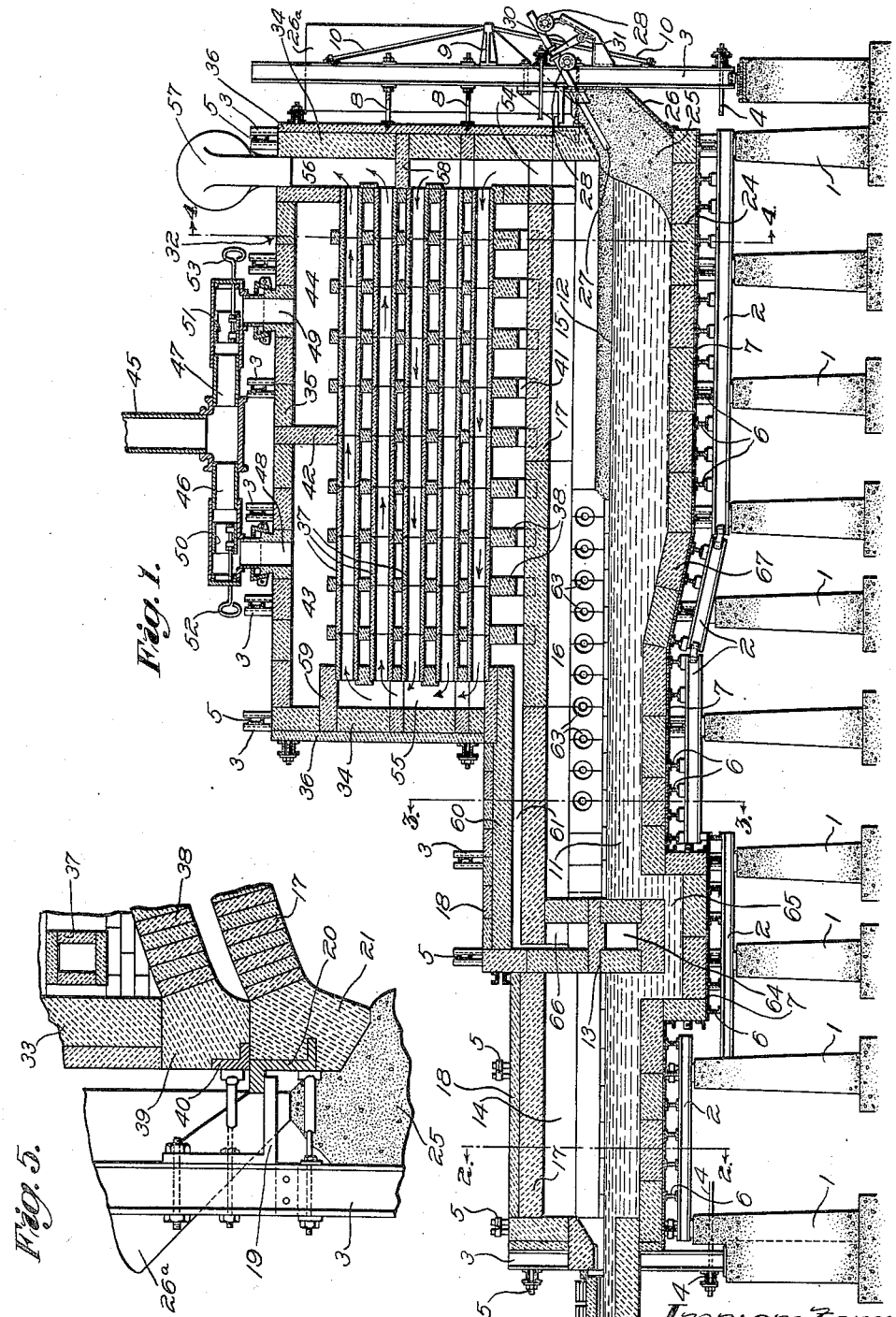
Figure 1 is a view in vertical longitudinal section of a glass melting tank embodying my invention as to structure and one in which my method may be carried out.
Figure 4:
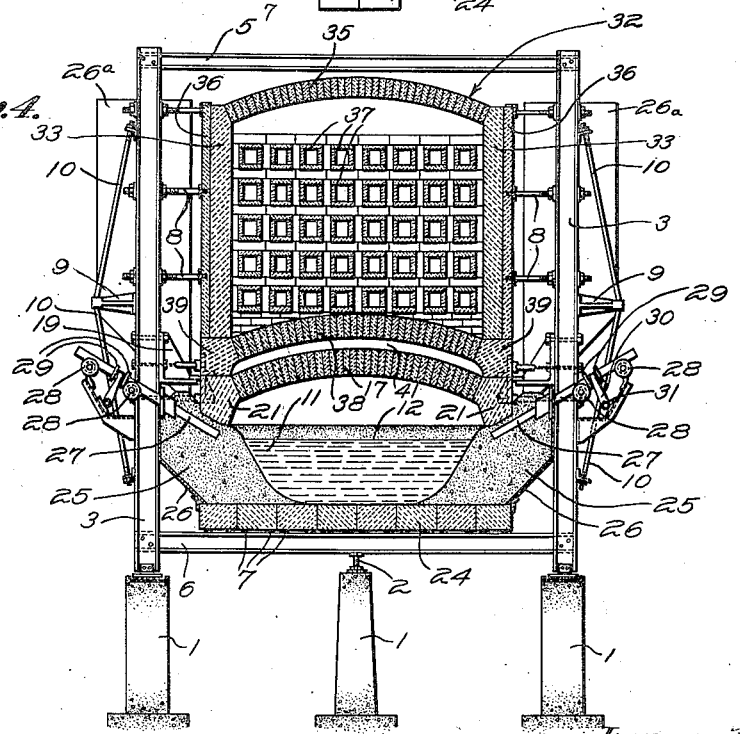
Fig. 4 is a view in vertical section taken substantially on the line 4—4 of Fig. 1.

In the accompanying drawings, there is illustrated a tank furnace constructed according to my invention and adapted to be operated according to the method herein set forth. As shown, the furnace is supported upon a plurality of masonry piers 1 which directly support substantially longitudinally extending beams 2 and also vertical buck stays 3. The buck stays are tied together at their lower and upper ends by suitable cross members generally indicated at 4 and 5 respectively, which may be in the form of structural metal members or tie rods. The bottom of the furnace is supported upon transversely extending I-beams or channels 6 which support the furnace bottom through substantially longitudinally extending metallic strips 7. Any suitable means of supporting the bottom of the furnace may be used, that shown being merely by way of example. The sides of the furnace and of the recuperator structure which is built above the crown of a portion thereof are laterally supported from the buck stays 3 by suitable thrust rods, generally indicated at 8 and are vertically supported as hereinafter to be described. As illustrated in Figs. 1 and 4, means may be provided for stiffening the buck stays 3, in the present instance such means are shown as laterally extending struts 9 connected to spaced portions of the buck stays by tension members 10. These members 9 and 10 serve the purpose of preventing bending of the buck stays when the furnace is in operation and more particularly during the initial heating of the furnace.

As illustrated (Fig. 1), the furnace comprises a tank-like structure for containing a bath of molten glass 11, which is preferably maintained at a predetermined desired depth up to substantially the line 12, which may be considered the normal level of the surface of the bath in the furnace. The glass-containing basin of the furnace is divided into two main chambers by a bridge wall generally indicated at 13, that portion of the glass-containing basin at the left of this bridge wall 13 as seen in Fig. 1 comprising a tempering chamber indicated at 14 to which any suitable means for dispensing or disposing of the glass may be connected, such means not forming any part of the present invention and hence not being illustrated, but including, for example, one or more forehearths for the gob feeding of glass, one or more suction pools for the suction gathering of glass or suitable means for providing for the drawing of glass into any desired form, such as sheets, cylinders, tubing or cane. That portion of the furnace to the right of the bridge wall 13, as seen in Fig. 1, may be considered as the melting and refining portions of the tank and includes a melting zone, generally indicated at 15, and a refining zone, generally indicated at 16, the dividing line between these two zones being somewhat indeterminate, but approximating the line of the right hand burner opening, as seen in the drawing (Fig. 1).

Figure 2:
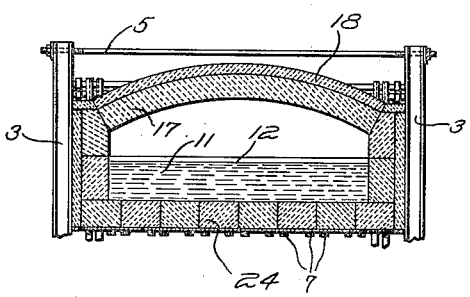
Fig. 2 is a view in vertical section taken substantially on the line 2—2 of Fig. 1.
Figure 3:
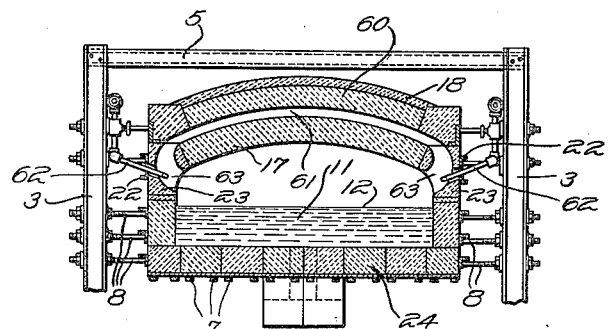
Fig. 3 is a view in vertical section taken substantially on the line 3—3 of Fig. 1.

Above the entire glass-containing basin of the tank is a crown or roof, generally indicated at 17, which may be insulated as illustrated at 18 by the provision of any suitable heat insulating material. The crown is preferably supported independently of the glass-containing basin from the buck stays 3, in a manner best illustrated in Figs. 4 and 5. As shown (Fig. 5) the buck stays 3 have secured thereto bracket members 19 which support longitudinally extending Z-shaped members 20. The members 20 in turn support skew blocks 21 between which the arched crown 17 is sprung. The manner of support of the portions of the furnace illustrated in Figs. 2 and 3 is somewhat different, involving the vertical support of the furnace bottom as above described, the side walls being supported vertically from the bottom and the vertical load of the crown being supported by the side walls. The lateral thrust of the arched crown and of the side walls are taken up by the buck stays 3 which support metallic structural members 22 which bear against the lateral sides of the skew blocks 23.

Glass making materials or batch may be supplied to the furnace in any suitable manner, that shown in the accompanying drawings being the manner more particularly shown, described and claimed in my copending application, Serial No. 639,216, filed October 24, 1932. According to the disclosure of that application, a desired portion of the normally refractory glass-contacting walls at the melting portion of the furnace are substituted by the glass making materials which it is desired to melt and convert into glass. Thus the refractory walls intermediate the skew blocks 21 and the bottom 24 of the furnace at this portion are omitted and a pile of glass making materials or batch is maintained in the space provided as illustrated at 25. The outside of this pile or wall of glass making materials may be bounded by any suitable confining means, such as the metallic wall 26, although it is not required that this wall be metallic or that it be of any particular form, the only essential being that there be some means for confining the glass making materials or batch against outward movement. Suitable means shown as hoppers 26a are provided for supplying glass making materials to the piles or wall 25. Means are provided for moving the glass making materials or batch inwardly of the furnace, in the present instance these means are shown as comprising pusher members 27 suitably mounted for endwise movement upon anti-friction rollers 28 and provided with spaced collars 29 between which extends the end or ends of actuating arms 30. The several arms 30 actuating the several pusher rods 27 are mounted upon shafts 31 extending along the end and/or sides of the furnace, these shafts being actuated by any suitable means, for example one or more fluid pressure motors (not shown). By the reciprocation of the rods 27 the glass making materials or batch are forced inwardly and downwardly of the furnace at substantially the same rate that these materials are melted off the piles 25 and converted into glass so as to maintain the integrity of these walls. At the same time the downward component of the force directed upon the glass making material tends to prevent undercutting of the walls by the molten glass which might cause portions of the material of these walls to float to the surface of the glass.

While I have shown in the accompanying drawings the walls 25 of glass making materials or batch on the two sides of the furnace as well as the end, it is contemplated that any desired length of wall may be constructed in this manner, for example, a portion or all of the end wall only. As above stated, however, this subject matter is more particularly described and is claimed in my said copending application and hence it will not be claimed herein. For the purpose of the present application, any desired means, including those old in the art, for supplying glass making materials or batch to the furnace may be used.

Arranged above the crown 17 of the furnace and preferably above the melting portion 15 thereof and a portion of the refining portion 16 is a heat recovery means, here generally indicated as a recuperator 32. As shown this recuperator is enclosed by side walls 33, ends walls 34, and a crown 35. The portion of the crown 17 of the furnace beneath the recuperator, serves as the bottom thereof. As shown, the side and end walls 33 and 34 of the recuperator may be provided with heat insulating coverings 36. The flues 37 through which the products of combustion pass in traversing the recuperator are built up of sections of heat resistant material of any suitable character and are supported at intervals by wall structures built up upon supporting arches 38 which are supported, as best seen in Fig. 5, from skew blocks 39 supported by longitudinally extending angle members 40 which may rest upon the Z-shaped members 20 and/or be supported from the buck stays 3. As shown in Fig. 1, the arches 38 are spaced longitudinally of the furnace and are also spaced above the crown 17 to provide therebetween a continuous passage 41 for the incoming air. The members making up the flues 37 may be constructed of relatively short portions, the length of which corresponds to the distance between centers of adjacent arches 38. Intermediate the ends of the recuperator there is provided a closed wall 42 extending completely from one of the arches 38 to the top 35 of the recuperator and dividing the recuperator into two zones 43 and 44, both of which communicate with the passage 41 at their lower portions, but which are otherwise separate and distinct from one another. Air is conducted to the recuperator from any suitable source, such as a blower (not shown), through a passage or duct 45 which branches into two passages 46 and 47, which communicate with the recuperator portions 43 and 44 through inlet ports 48 and 49 respectively. Means are provided for controlling the amount of air passing through recuperator sections 43 and 44 so as both to control the amount of air passing through the recuperator as a whole and independently to control the proportion of this total amount of air which passes through each of the recuperator sections. As shown, this means comprises a pair of sleeve valves 50 and 51 which are provided with suitable operating means indicated as the handles 52 and 53 respectively. Any suitable type of valve and operating means therefor may be used, the structure shown being for purposes of illustration only.

As illustrated in the accompanying drawings, there are five vertical series of flues 37 through which the products of combustion are caused to pass after they leave the furnace. There is provided a passage 54 communicating between the right hand end of the furnace, as seen in Fig. 1, that is the end at which the melting initially takes place and at which the glass making materials or batch are supplied to the furnace, and the lower three series of flues 37 of the recuperator. The gases then pass through these series of flues to a chamber 55 and thence in the reverse direction through the upper two series of flues to a stack chamber 56 whence they pass through the duct generally indicated at 57 to the stack (not shown). Baffles 58 and 59 constrain the products of combustion to the paths above described. While the particular recuperator illustrated in the drawings has been specifically described, it will be understood that this description should be taken not as limiting, but for purposes of illustration only. Also it is contemplated if desired that the products of combustion may be passed through a further recuperative structure, such as a metallic fire tube type of boiler in order to give up some of their remaining heat to the incoming air before it enters the recuperator shown, if desired. This structure has not been illustrated, however, in the accompanying drawings as its use is optional.

The preheated air coming from the recuperator through the passage 41 is conducted along the crown 17 of the furnace to an extension 61 of this passage between a double crown portion of the furnace, as shown between the main crown 17 and the upper crown 60 (Figs. 1 and 3). Along each side of the furnace in the refining zone 16 thereof there is provided a plurality of burners for supplying the combustible medium to the furnace. As illustrated in Figs. 1 and 3, these burners are shown diagrammatically at 62 and are directed inwardly and downwardly of the furnace through suitable ports or burner openings 63 which may be formed in the skew blocks 23 or in any suitable burner blocks properly positioned with respect to the furnace. Air for supporting combustion passes either directly from the passage 41 or from the passage 61 through lateral ducts to the burner openings 63, as illustrated in Fig. 3. Thus the air in its passage from the recuperator to the furnace is at all times progressively more highly heated so that it may absorb heat passing through the crown 17 of the furnace which would be lost were it not for the particular construction provided by the present invention. This portion of the furnace, that is the crown 17, thus forms a common wall between the interior of the furnace and an air passage and thus may be considered as in effect forming a part of the recuperator structure. This cures one of the most series defects of previous types of recuperator furnaces wherein a major difficulty was in obtaining air preheated to the necessary temperature in order to maintain the desired temperatures in the furnace.

The bridge wall 13 is preferably provided with a passage 64 through which a cooling medium may be passed to maintain the bridge wall sufficiently cool in order that its life be commensurate with the life of other portions of the furnace. This cooled portion of the bridge wall extends beneath the normal level 12 of the glass in the furnace and above the submerged throat 65 through which glass passes from the melting and refining chamber 15 and 16 to the tempering chamber 14. As illustrated, the bridge wall is also provided with a hollow portion 66 communicating with the air passage 61 through which air may be supplied to a burner or burners (not shown) which supply any necessary heat to the tempering chamber 14. The temperature conditioning of this portion of the furnace forms no part of the present invention and hence may be assumed to be conventional or constructed in any desired manner.

As illustrated (Fig. 1) the glass bath in the melting portion 15 of the furnace is deeper than that in the refining portion 16, there being an inclined section 67 on the floor of the furnace separating these two sections. This provides a shorter path for the gases to pass from the lower strata of glass to the surface thereof in the refining chamber in which the glass is held at an elevated temperature, as hereinafter to be described, for the release of included gases. The extra depth in the melting chamber affords more melting volume according to the method of melting herein disclosed. In describing the operation of the furnace, the particular manner of feeding the glass making materials or batch thereto will not be considered, for as above set forth this subject matter forms the basis for an independent application for patent and further it is not essential to the construction or to the carrying out of my present method. It will therefore be assumed that the glass making materials or batch are supplied to the right hand end of the furnace, as seen in Fig. 1.

As set forth in the introduction to this specification, it has been found in glass furnace operation that there exists a definite time factor in the refining of glass, that is in the transition between fused glass making materials and finished glass, that must be provided to adapt it to the manufacture of commercial drawn or otherwise shaped glass. This time factor must be provided for to permit the necessary chemical changes to take place, such for example as the formation of the various silicates of which glass is composed, and also and perhaps more particularly for the elimination from the fused glass making materials of certain gaseous products of the chemical reactions which are given off during the refining of the glass. These gaseous products comprise mainly carbon dioxide which is produced from the decomposition of the soda ash used as a constituent of the batch. However, irrespective of the particular chemical reactions which take place and of the particular products of those reactions, it is known that the production of good glass including the elimination of the gaseous products which are necessarily given off during its production require both time and heat. It has further been found that the higher the temperature at which the glass is maintained during this period of its formation, the more rapid is the completion of the necessary chemical changes and the elimination of the gaseous matter which is evolved in the glass in the form of bubbles or seeds. Thus for example if the furnace be operated at its normal rated capacity, which may for purposes of discussion be 40 tons in 24 hours, a certain definite time must be provided for the necessary chemical reactions to take place and for the elimination of the gases included in the glass. This provision is made by the construction of a furnace of the necessary size, so that the average time of travel of a modicum of glass between the point at which the materials therefor are first fused and the end of the refining zone is equal to the necessary time for the refining of this modicum of glass. The temperatures in the various portions of the furnace are adjusted accordingly. If, however, as sometimes happens, the demands upon the furnace for glass are less and it is required to produce glass only at the rate of, let us say, twenty tons per twenty-four hours, then the time for a modicum of glass to pass from the point at which the materials therefor are first melted to the end of the refining zone is increased and may be considered as twice the time of the previous example. If then the time permitted on the basis of the forty ton pull on the tank is sufficient properly to refine the glass, then if the tank is operated at a twenty ton rate, this time is twice what is necessary. However, according to previous practices, the temperature gradient in the furnace is maintained substantially the same independently of the rate at which the furnace is operated. Inasmuch as the amount of heat required to melt the glass making materials does not form a very large part of the total amount of heat supplied to the furnace as contrasted with the heat dissipated in other ways, it has been found that the fuel requirements for prior art tanks are substantially the same independently of the rate at which these tanks were operated. Thus the cost per ton of glass rose materially with any reduction in the rate of tank operation.

Thus in the prior art tanks, the operation of a tank at a fraction of its capacity resulted in what may be considered an extra refining time being given to the glass, it being remembered that the glass was exposed to refining temperatures for a relatively longer time than is essential. This resulted in somewhat non-uniform glass as the characteristics of glass depend to a material extent upon the degree of refinement thereof and, of course, all furnaces must be constructed and operated that at their rated capacity they will sufficiently refine glass for the use or uses to which it is to be put.

According to my present invention, and the methods which I contemplate using, the products of combustion are generated in the refining zone 16 of the furnace into which zone the several burners are directed. The temperature in this zone is to be maintained constant irrespective of the rate at which the furnace is operated. This temperature is preferably maintained between 2650° to 2750° F., and preferably approximates 2700° F. However, it will be noted from a consideration of Fig. 1, that the products of combustion pass from the zone 16 through the melting zone 15 to the outlet duct 54 by which they are conducted to the recuperator. During their travel through this path there will inevitably be a temperature drop, so that the actual melting, assuming the glass making materials or the batch to be supplied to the right hand end of the furnace, as seen in Fig. 1, will be accomplished by the "tail heat", that is, the heat of the gases just prior to their exit from the furnace, which will be at a temperature materially below that of the high temperature or refining zone, this temperature difference preferably being greater than 350° F. It is contemplated that the temperature of the gases leaving the furnace will be from 2000° to 2350° F., although these temperatures are not to be considered as necessarily limiting upon the operation of the furnace. Thus there is a material temperature drop contemplated according to my method between the high temperature refining zone and the melting temperature at which the products of combustion leave the furnace. This results in a more efficient utilization of the heat content of the products of combustion than any taught by or in use in the prior art, wherein the practice is to withdraw the products of combustion from the furnace at temperatures not more than 200° F. less than the maximum furnace temperature. The prior art for the most part also teaches the operation of furnaces to the end that the melting zone be maintained at maximum temperature, so as to melt the maximum amount of glass per square foot of melting surface area in the furnace. The present invention, by utilizing the tail heat of the gases at a lower temperature to effect the melting of the glass making materials, results in more economical operation for two reasons; first, that the amount of fuel which must be burnt for each ton of glass produced is decreased, and second, that due to the lower temperatures in the melting zone, it is possible to construct that portion of the furnace of cheaper materials, super-refractories being largely unnecessary, or if used, they have a much longer life.

From an operating standpoint, it is contemplated, according to my present method, that the gases be supplied to the furnace at such a rate, in accordance with the rate of operation or draw upon the furnace, that their exit temperature will be higher with an increased rate of furnace operation in accordance with a predetermined schedule which may be practically worked out for any given furnace. Thus from an operating standpoint, if the furnace is to be operated at its high or rated capacity, sufficient fuel will be supplied thereto, first, so that the temperature in the refining zone 16 will be maintained constant at the desired temperature (2650° to 2750° F.); and second, so that the temperature drop in the gases will be relatively small. Thus the average temperature to which a modicum of glass is exposed during its relatively short time of travel between the point at which the glass making materials therefor are melted and its arrival at the end of the refining zone will be proportionately high, to compensate for the proportionately low time of travel of this modicum of glass. If, on the other hand, the furnace is to be operated at a relatively low rate, a smaller amount of fuel will be supplied thereto, perhaps not smaller in exact proportion to the decrease in the rate of furnace operation, but materially smaller than the rate of fuel supply for the high rate operation. The burners and air supply will be so adjusted that the temperature in the refining zone 16 will still be maintained substantially the same as for the high rate operation, but due to the smaller rate of fuel supply and lower gas velocity through the furnace, the temperature drop in the products of combustion will be materially greater. However, under these circumstances, the time of travel of a modicum of glass from its melting point to the end of the refining zone will be materially increased, so that the glass upon reaching the end of the refining zone will be refined to substantially the same extent, considering the time-temperature relation above described, as in the case of the high rate furnace operation. Also, as the glass in the refining zone will be heated to the same temperature, there is afforded the same opportunity for the release of included gases or seeds.

This in practice results in the production of substantially uniform glass independent of the rate of furnace operation, and also, what is more important from the point of view of the glass manufacturer, results in a material saving in fuel cost for furnace operation when operating at a relatively low rate.

It is contemplated, for example, that the average time of travel of a modicum of glass from the point at which the materials therefor are melted to the end of the refining zone times a function of the average temperature of the gases adjacent to the zones through which this modicum of glass travels will be substantially a constant for rates of furnace operation within the economical operating range, i. e., not less than 50% of the rated capacity of the furnace; and further, that when the furnace is operated at a relatively high rate, there will be a higher temperature gradient for the gases in their passage through the furnace and a higher exit temperature therefor. The temperature of the gases in the refining zone will, however, be maintained substantially constant for all rates of furnace operation.

The peculiar construction of the recuperator in a plurality of independently controllable zones or portions is adapted peculiarly to cooperate with the furnace and a method of furnace operation, as above set forth. For example, should the furnace be operated at a relatively high rate, the gases leaving the furnace will be at a relatively high temperature, so that when these products of combustion pass into the first series 37 of flues of the recuperator, there might be a tendency rapidly to burn out these flues were it not for the fact that provision is made for diverting a relatively large proportion of the air passing through the recuperator into this section and thus maintaining the flues therein within the desired temperature limits. Furthermore, the use of a recuperator of this type provided with independently controllable zones as to the air passages therethrough, contiguous with the roof of the furnace, may also be employed, at least partially to control the temperature of this roof or crown of the furnace by apportioning the air as desired between the several zones of the recuperator and thus controlling the amount of air which scrubs over different portions of the furnace crown.

While I have referred to glass in the foregoing description, and in the appended claims, I do not wish this term to be construed in the restrictive sense, but rather desire that it be considered as including any and all glass-like materials, such for example as water glass, vitreous enamels, etc. The specification and claims should be read with this in mind.

While I have described both a particular furnace construction and method of operation thereof as an example of my invention, I do not wish to be limited to the method particularly described as certain changes may be made therein and certain individual portions thereof may have independent utility. My invention is, therefore, to be measured by the appended claims which are to be construed as broadly as the state of the prior art permits.

I claim:

1. The method of making glass of uniform quality at different rates in a tank type furnace, which comprises supplying glass making materials to the interior of a tank furnace adjacent to one end thereof, withdrawing glass from the opposite end of the furnace at the rate desired, controlling the rate of supply of the glass making materials to cause it substantially to equal the rate of withdrawal of finished glass from the furnace so that the furnace will always contain a substantially constant quantity of molten glass in the making, generating products of combustion in the furnace over the bath of molten glass by introducing into the furnace at a zone spaced a substantial distance from the end at which the glass making materials are introduced fuel and preheated air and thereby maintaining said zone at a substantially constant high temperature, withdrawing the products of combustion from the furnace adjacent to the end thereof at which the glass making materials are supplied, utilizing a part of the heat of the outgoing gases for preheating air to be supplied to the furnace, and controlling the rate of supply of fuel and preheated air in accordance with the rate of withdrawal of glass from the furnace so that the temperature drop in the products of combustion in passing from the substantially constant high temperature zone to their point of outlet from the furnace increases with the average time of travel of the glass from the end of the furnace to which the glass making materials are supplied to the substantially constant high temperature zone, whereby the glass is always refined to substantially the same extent and is uniform independently of the rate at which the furnace is operated.

2. The method of making glass of uniform quality at different rates in a tank type furnace, which comprises supplying glass making materials to the interior of a tank furnace adjacent to one end thereof, withdrawing glass from the opposite end of the furnace at the rate desired, controlling the rate of supply of the glass making materials to cause it substantially to equal the rate of withdrawal of finished glass from the furnace so that the furnace will always contain a substantially constant quantity of molten glass in the making, generating products of combustion in the furnace over the bath of molten glass by introducing into the furnace at a zone spaced a substantial distance from the end at which the glass making materials are introduced fuel and preheated air and thereby maintaining said zone at a substantially constant high temperature, withdrawing the products of combustion from the furnace adjacent to the end thereof to which the glass making materials are supplied, utilizing a part of the heat of the outgoing gases for preheating air to be supplied to the furnace, and controlling the rate of supply of fuel and preheated air in accordance with the rate of withdrawal of glass from the furnace so that the product of the average time of travel of the glass from the end of the furnace to which the glass making materials are supplied to the constant high temperature zone thereof times the average temperature of the products of combustion in passing from the constant high temperature zone to their outlet from the furnace is substantially constant for rates of furnace operation not less than 50% of rated capacity, whereby the glass is always refined to substantially the same extent and is uniform independently of the rate at which the furnace is operated.

3. The method of making glass of uniform quality at different rates in a tank type furnace, which comprises supplying glass making materials to the interior of a tank furnace adjacent to one end thereof, withdrawing glass from the opposite end of the furnace at the rate desired, controlling the rate of supply of the glass making materials to cause it substantially to equal the rate of withdrawal of finished glass from the furnace so that the furnace will always contain a substantially constant quantity of molten glass in the making, generating products of combustion in the furnace over the bath of molten glass by introducing into the furnace at a zone spaced a substantial distance from the end at which the glass making materials are introduced fuel and preheated air and thereby maintaining said zone at a substantially constant high temperature, withdrawing the products of combustion from the furnace adjacent to the end thereof to which the glass making materials are supplied, utilizing a part of the heat of the outgoing gases for preheating air to be supplied to the furnace, and controlling the rate of supply of fuel and preheated air in accordance with the rate of withdrawal of glass from the furnace so that the temperature in the high temperature zone to which the fuel and air are supplied is maintained substantially constant for all rates of furnace operation while the exit temperature of the products of combustion leaving the furnace and the temperature gradient in and of the products of combustion in passing from the high temperature zone to their point of exit from the furnace is higher in a predetermined relation with higher rates of tank operation, whereby the glass is always refined to substantially the same extent and is uniform independently of the rate at which the furnace is operated.

4. The method of making glass of uniform quality at different rates in a tank type furnace, which comprises supplying glass-making materials to the interior of a tank furnace adjacent to one end thereof, withdrawing glass from the opposite end of the furnace at the rate desired, controlling the rate of supply of the glass making materials to cause it substantially to equal the rate of withdrawal of finished glass from the furnace so that the furnace will always contain a substantially constant quantity of molten glass in the making, generating products of combustion in the furnace over the bath of molten glass by introducing into the furnace at a zone spaced a substantial distance from the end at which the glass-making materials are introduced, fuel and preheated air, and thereby maintaining said zone at a substantially constant temperature in the neighborhood of 2700° F., withdrawing the products of combustion from the furnace adjacent to the end thereof to which the glass-making materials are supplied, utilizing a part of the heat of the outgoing gases for preheating air to be supplied to the furnace, and controlling the rate of supply of fuel and preheated air in accordance with the rate of withdrawal of glass from the furnace so that the temperature drop in the products of combustion passing from the substantially constant high temperature zone to their point of outlet from the furnace increases with the average time of travel of the glass from the end of the furnace to which the glass-making materials are supplied to the substantially constant high temperature zone and so that the exit temperature of the gases varies with varying load between the temperatures of 2350° and 2000° F.

5. The method of making glass in a tank type furnace, which comprises supplying glass-making materials to the interior of a tank furnace adjacent to one end thereof, withdrawing finished glass from the opposite end of the furnace, controlling the rate of supply of the glass-making materials to cause it substantially to equal the rate of withdrawal of finished glass from the furnace so that the furnace will always contain a substantially constant quantity of molten glass in the making, generating products of combustion in the furnace over the bath of molten glass by introducing into the furnace at a zone spaced a substantial distance from the end at which the glass-making materials are introduced, fuel and preheated air, and thereby maintaining said zone at a substantially constant high temperature for the refining of the glass, withdrawing the products of combustion from the furnace adjacent to the end thereof to which the glass-making materials are supplied, utilizing a part of the heat of the outgoing gases for preheating air to be supplied to the furnace to support combustion, and controlling the rates of supply of fuel and preheated air so that the temperature of the products of combustion leaving the furnace is at least 350° F. less than the temperature of the gases in said zone of substantially constant high temperature.

6. The method of making glass in a tank type furnace which is adapted to be supplied with glass making materials at a portion thereof, which comprises maintaining the glass in a zone in said furnace spaced a material distance from said portion at a substantially constant high temperature, and maintaining temperature gradients between said portion and said zone regulated in accordance with the rate at which glass is being made in said furnace and such that the melting temperature for the glass making materials is higher with a higher rate of furnace operation, there being for all rates of furnace operations a substantial temperature difference between said portion and said zone.

7. The method of operating a glass making tank of the type having a portion in which glass making materials are melted and an adjacent portion to which molten glass flows from the melting portion and in which such glass is refined, comprising the steps of applying to the glass in the melting and refining portions heating media having a temperature gradient decreasing toward the melting portion, and varying the slope of said gradient in accordance with variations in the rate of flow of glass from the melting portion to the refining portion in such manner that the slope of the gradient is increased with a decrease in the rate of flow.

8. The method of operating a glass making tank of the type having a portion in which glass making materials are melted and an adjacent portion to which molten glass flows from the melting portion and in which such glass is refined, comprising the steps of establishing a zone of relatively high temperature in the refining portion, heating the glass from the melting portion to said zone of high temperature to provide an increasing temperature gradient in the glass as it flows from said melting portion to said zone, and varying the rate of increase of said gradient from the melting portion to said zone of high temperature with relation to variations in the rate of flow of glass from said melting portion to said zone of high temperature.

9. The method of operating a glass making tank of the type having a portion in which glass making materials are melted and an adjacent portion to which molten glass flows from the melting portion and in which such glass is refined, comprising the steps of causing currents of heating media to traverse the surface of the glass from the refining portion to the melting portion and controlling the time of travel of said currents from the refining portion to the melting portion in accordance with the rate of flow of glass from the melting portion to the refining portion in such manner that the time of travel of said currents is increased with decreasing rates of flow of the glass as aforesaid.

10. The method of operating a glass making tank of the type having a portion in which glass making materials are melted and an adjacent portion to which molten glass flows from the melting portion and in which such glass is refined, comprising the steps of introducing a combustible mixture into the space above glass in the refining portion to produce a zone of relatively high temperature locally therein, causing the products of combustion of said mixture to pass from said zone along the glass between said refining portion and the melting portion, withdrawing products of combustion from the melting portion of the tank, and varying the combustible mixture introduced into the refining zone in accordance with variations in the rate of flow of glass from the melting portion to the refining portion to maintain substantially constant the temperature in said zone of high temperature for different rates of flow of glass.

GEORGE E. HOWARD.